United States Patent [19]

Futhey

[11] Patent Number: 4,936,666
[45] Date of Patent: Jun. 26, 1990

[54] DIFFRACTIVE LENS

[75] Inventor: John A. Futhey, Petaluma, Calif.

[73] Assignee: Minnesota Mining and Manufacturing Company, St. Paul, Minn.

[21] Appl. No.: 391,121

[22] Filed: Aug. 8, 1989

[51] Int. Cl.$^5$ .......................... G02B 3/08; G02B 13/18
[52] U.S. Cl. .................. 350/452; 350/162.16; 350/162.17; 350/162.24; 350/432
[58] Field of Search .................. 350/162.16, 162.17, 350/162.18, 437, 452

[56] References Cited

U.S. PATENT DOCUMENTS 3,390,399  6/1968  Leonard .............................. 350/452
4,787,722  11/1989  Claytor ............................... 350/452

FOREIGN PATENT DOCUMENTS 194201  8/1987  Japan .................................... 350/452

OTHER PUBLICATIONS d'Auria et al, "Photolithographic Fabrication of Thin Film Lenses", Optics Communications, vol. 5, No. 4, pp. 232-235.

Primary Examiner—Bruce Y. Arnold
Assistant Examiner—Vincent A. Frouhar
Attorney, Agent, or Firm—Donald M. Sell; Walter N. Kirn; Stephen W. Buckingham

[57] ABSTRACT

A diffractive lens has a plurality of diffractive zones at least one of which has an optical step having an optical height equal to $j\lambda$ and at least one of which has an optical step having an optical height equal to $k\lambda$ where $\lambda$ is a design wavelength of the lens and $j$ and $k$ are unequal nonzero integers. Alternatively stated at least one of the optical steps induces a relative phase shift of $2j\pi$ at the back conjugate point between two light rays emerging from a point source at the front conjugate point and striking the lens immediately on opposite sides of the step and at least one of the steps induces a relative phase shift of $2k\pi$ at the back conjugate point between two light rays emerging from a point source at the front conjugate point and striking the lens immediately on opposite sides of that step.

28 Claims, 2 Drawing Sheets

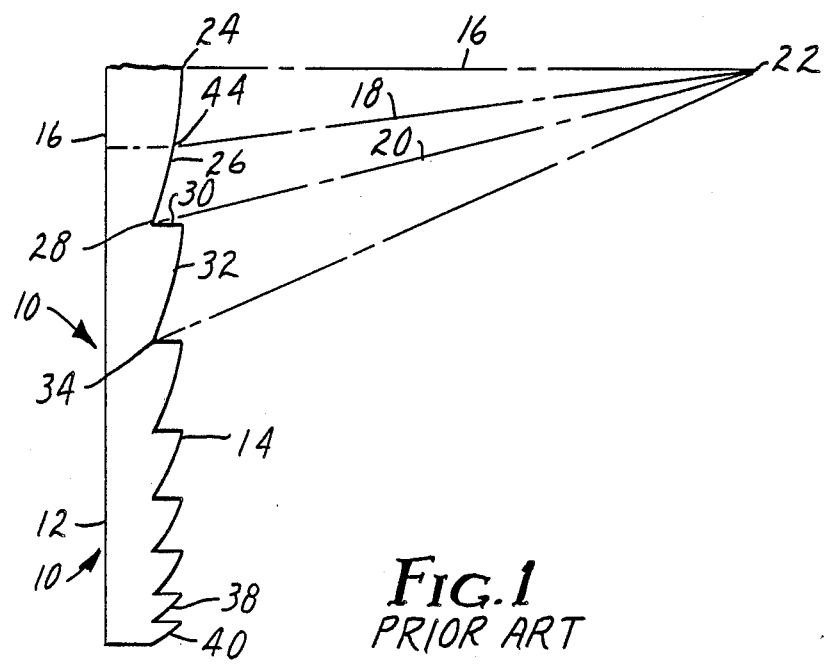
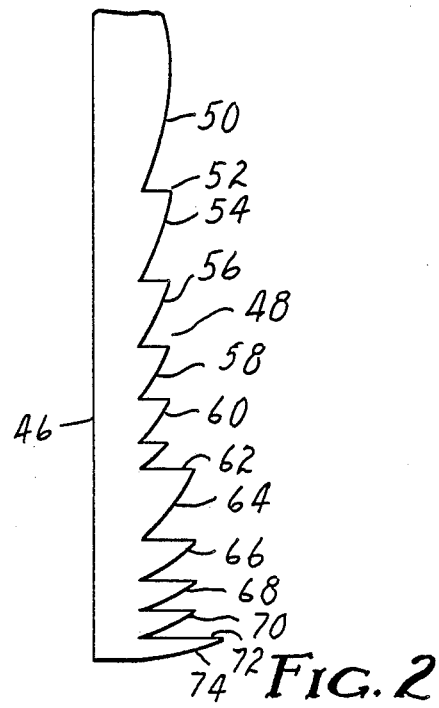 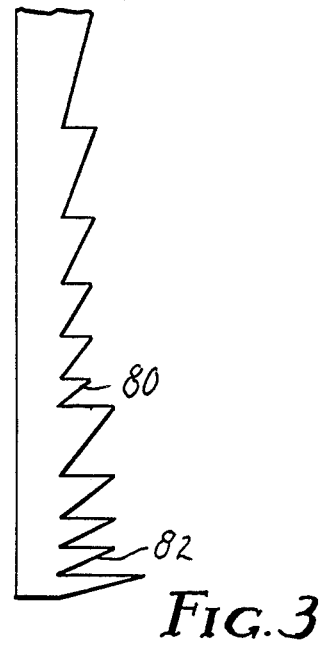
Fig. 1 PRIOR ART
Fig. 2   Fig. 3

DIFFRACTIVE LENS

FIELD OF THE INVENTION

The present invention relates to lenses having diffractive power.

BACKGROUND OF THE INVENTION

Refraction is the well-known phenomenon whereby light changes direction when passing from a medium having a first index of refraction to one having a second index of refraction unless the beam of light strikes the interface between the two media perpendicular to that interface. Traditional lenses operate because of refraction. Such lenses, operating by refraction, have been known for many years.

It is also possible to construct lenses operating due to the principle of diffraction. Diffractive lenses, while of more recent origin than refractive lenses, still have been known for over one hundred years. Diffractive lenses are very sensitive to the wavelength of the light striking them. Furthermore they require that the sizes of the diffractive regions be very precisely manufactured. Therefore diffractive lenses were not in significant usage until recently. With the advent of good monochrome light sources, such as lasers and light emitting diodes, and precise machining and replication techniques, diffractive lenses have become more important.

One type of diffractive lens is sometimes called a kinoform. In such a lens the diffractive zones are formed as a series of structures on a surface of the lens. These structures can be formed in a variety of ways. They may be etched using a photolithographic process, they may be directly lathe cut in the surface of the lens, or a master may be manufactured from which the lenses are manufactured using known techniques such as injection molding. Alternatively the structures may be formed at the interface of two materials with different indices of refraction in order to construct a kinoform with smooth outer surfaces. Similarly the structures may be formed by introducing a dopant that alters the index of refraction into selected regions of the lens substrate.

In order for the lens to operate properly the sizes of the zones must be very precisely controlled. Because the zone widths are smaller in the zones farther from the optical axis of the lens, it is often hard to form the outer zones. This problem is particularly pronounced in "fast" lenses, i.e. those designed to operate at a high aperture to focal distance ratio. In such lenses the outer zones are very narrow.

SUMMARY OF THE INVENTION

In the invention, a lens has diffractive power produced by diffractive zones. The zones are terminated by optical steps. A first group of zones has optical steps having optical heights equal to $j\lambda$ and a second group of zones has optical steps equal to $k\lambda$ where $\lambda$ is a design wavelength of light of the lens and j and k are unequal nonzero integers. Alternatively, the invention may be described as a lens having diffractive power produced by diffractive zones where a first group of zones has optical steps having optical heights such that a step will produce a relative phase shift equal to $2j\pi$ at a point on the optical axis at a distance from the lens equal to the back focal distance between two light rays of the design wavelength of the lens emanating from a point source on the optic axis of the lens at a distance equal to the front focal distance of the lens from the lens and striking the lens immediately on opposite sides of the optical step. The lens further has a group of zones having optical steps having optical heights such that a step will produce a relative phase shift of $2k\pi$ at a point on the optical axis at a distance from the lens equal to the back focal distance between two light rays of the design wavelength of the lens emanating from a point source on the optical axis of the lens at a distance equal to the front focal distance of the lens from the lens and striking the lens immediately on opposite sides of the step. In this formulation, j and k are unequal nonzero integers.

BRIEF DESCRIPTION OF THE DRAWINGS

FIG. 1 is a schematic cross-sectional view of a prior art kinoform;

FIG. 2 is a schematic cross-sectional view of a diffractive lens according to the invention;

FIG. 3 is a schematic cross-sectional view of a diffractive lens according to a different embodiment of the invention;

DETAILED DESCRIPTION OF A PREFERRED EMBODIMENT

Figure 4:
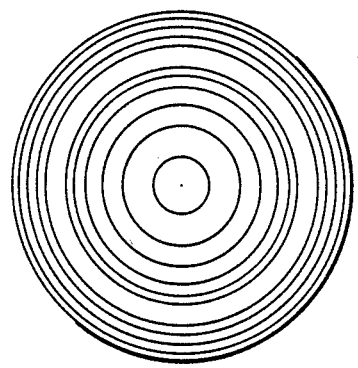
FIG. 4 is a schematic front view of a lens according to the invention.

Diffractive lenses typically use diffractive zones that are either linear or circular. Lenses using linear or rectangular zones have focal characteristics similar to those of a cylindrical refractive lens. Diffractive lenses utilizing concentric circular zones have focal characteristics similar to those of a spherical refractive lens. The present invention will be described in the context of such lenses utilizing linear or circular zones. Those skilled in the art, however, will recognize that these zones could be elliptical or even of arbitrary shape. The effect is simply that the focal length would vary along different radii of the lens.

FIG. 1 shows a kinoform 10 of the prior art. It is important to note that the nature of diffractive optics makes it necessary to design a lens with a specific front conjugate point and a specific back conjugate point, unlike the more familiar spherical refractive optics in which moving the front conjugate point will simply move the back conjugate point. In the case of diffractive optics moving the front conjugate point will generally degrade performance quite rapidly. The lens of FIG. 1 is a collimator. A collimator is a special case where the front conjugate point is at a finite distance from the lens, the front focal distance, while the back conjugate point is at an infinite distance. The invention will be described with respect to collimators, although those skilled in the art will recognize that the front focal distance could be infinite and the back focal distance finite or both focal distances could be finite within the scope of the invention.

In FIG. 1 diffractive lens 10 has a smooth side 12 and a structured side 14. As shown, structured side 14 is designed to be the first surface, i.e. the surface struck by the in-coming light, although kinoforms in which the structured surface is the second surface are also known. As will be explained, the size of the structures on structured surface 14 is determined by the intended focal length of the lens, the relative indices of refraction of the lens and the surrounding media, and the wavelength of the light for which the lens is designed, often known as the design wavelength.

The lens of FIG. 1 will be described with respect to light emanating from a point source at the front focal distance from the lens. Since lens 10 is a collimator such light would emerge from the lens collimated. Lens 10 has a smooth surface, 12, and a structured surface 14. Light rays 16, 18, and 20 emanate from a point 22. Light ray 16 strikes structured surface 14 at point 24. Light ray 16 travels along the optic axis of lens 10. Normally this would be at the center of the lens but nothing prevents the lens from being asymmetric and having the optic axis at another location. Structured surface 14 follows a smooth curve 26 from point 24 to point 28. Curve 26 is designed such that, if the distance from point 22 to point 24 is equal to the front focal distance of the lens, the optical path length from point 22 through any point on curve 26 to surface 12 will be equal. More generally the optical path length from the front conjugate point through the lens, to the back conjugate point should be constant, but, since in FIG. 1 the back conjugate point is at infinity, the distance after the light emerges from lens 10 may be ignored. Using light ray 18 as an example, the optical path length is defined as $(l_{22} \times n_2) + (l_{46} \times n_1)$ where $l_{22}$ is the distance from point 22 to point 44, $l_{46}$ is the distance from point 44 to point 46, $n_1$ is the index of refraction of the lens and $n_2$ is the index of refraction of the surrounding medium. Point 28 is chosen such that an optical step 30 may be provided where optical step 30 has an optical height equal to the design wavelength of the lens and the lens has the same thickness after the optical step as it had at point 24. For these purposes optical height is defined as $h \times (n_1 - n_2)$ where h is the actual physical height of the step, $n_1$ is the index of refraction of the material of lens 10 and $n_2$ is the index of refraction of the surrounding medium.

More generally optical step 30 does not necessarily cause lens 10 to have the same thickness after step 30 as it had at point 24. This is because the lens may have a refractive power in addition to its diffractive power. In order to provide such a refractive power, surface 12 may be curved. Alternatively the structures of surface 14 may be superposed on a smooth curve or such superposition may occur in conjunction with a curvature of surface 12. Thus, in general, the actual contour of surface 14 deviates from the underlying curve over the width of each diffractive zone and returns to the underlying curve at the optical steps. Lens 10 is then a special case in which the underlying curve has an infinite radius of curvature, i.e., is a plane surface.

The statement that the optical steps have optical heights of one wavelength is actually an approximation, although normally a very good one. Actually, the optical steps should be of a size that will produce a relative phase shift of $2\pi$ at the back conjugate point (i.e., one wavelength) between light rays of the design wavelength emanating from a point source on the optical axis at a distance equal to the front focal distance from the lens and striking the lens immediately on opposite sides of the step. For these purposes it should be noted that the back conjugate point is a point on the optical axis at a distance from the lens equal to the back focal distance. As the angle between the optical axis of the lens and the line connecting the front conjugate point with the step increases, a correction to the optical height of the step based on trigonometric considerations must be introduced. This requirement is most relevant to lenses designed to operate with a very large aperture to focal distance ratio. The term focal distance is used here without reference to the front or back focal distance because the ratios of the aperture to both focal distances are important.

In order to achieve the constant optical distance described above, curve 26 should preferably be hyperbolic. If so the zone is said to have a hyperbolic contour. In many circumstances, however, a circular curve will be a close enough approximation to a hyperbola to function properly. In some situations even a straight line will suffice. Such zones are said to have circular and linear contours, respectively.

After step 30, structured surface 14 follows curve 32 until it reaches point 34. Curve 32 again provides a constant optical path length from point 22 to planar surface 12. After curve 32 reaches point 34, another optical step having an optical height equal to the design wavelength is provided. Succeeding diffractive zones are similarly designed. Each zone becomes progressively smaller than the proceeding one. In general the distance from point 24 to the optical step at the outer edge of any given zone will be equal to $R_0 + \sqrt{2n\lambda f + n^2 \lambda^2}$ where $R_0$ is the distance from point 24 to the outer edge of the inner or central zone, n is the number of the zone counting from the central zone, $\lambda$ is the design wavelength of the lens, and f is the focal length of the lens. Most common designs allow $R_0$ to be equal to zero.

As will be readily apparent outer zones such as zones 38 and 40 will be quite small. If the aperture to focal length ratio was to be even greater, even smaller zones would be required. Because of the extremely small size of such outer zones it is very difficult to accurately manufacture them.

FIG. 2, illustrates the lens according to the present invention. The lens of FIG. 2, includes a smooth surface 46 and a structured surface 48. As shown in FIG. 2, smooth surface 46 is planar and the bases of the structures on structured surface lie in a plane. Alternately, surface 46 could be curved or the structures on structured surface 48 could be superposed on a curved surface having a finite radius of curvature or both. In such a case, the lens could add refractive power to the diffractive power.

As shown in FIG. 2, the diffractive zones are formed as structures on surface 48. These structures cause a relative phase shift between two rays of light striking the lens immediately on opposite sides of an optical step. This phase shift arises from the difference between the indices of refraction of the lens material and the surrounding medium. If a diffractive lens having smooth surfaces is desired, the diffractive zones could be formed by implanting selected regions of the lens with a dopant that alters the index of refraction of the lens. Alternatively, the zones could be formed on the interior of a lens by covering surface 48 with a material with a different index of refraction.

The structure of FIG. 2, avoids the problem of the small size of the outer zones by combining what would have been two or more zones according to prior art into a single zone. Thus in the lens of FIG. 2, zones 50, 54, 56, 58, and 60 correspond to the first 5 zones of the lens of FIG. 1. The optical step associated with each of these zones, such as optical step 52, all have an optical height equal to the design wavelength. Diffractive zone 62, however, corresponds to zones 6 and 7 of the lens of FIG. 1. Diffractive zone 62 is therefore the first "superzone," a zone corresponding to more than one zone of a prior art lens. The step 64 associated with zone 62 has an optical height equal to twice the design wavelength. Similarly zones 66 and 68 would each have a width equal to 2 zones of a prior art lens and would have steps having an optical height equal to 2 times the design wavelength. Diffractive zone 70 is a superzone corresponding to 3 diffractive zones of a lens of the prior art. The step 72 associated with zone 70 has an optical height equal to 3 times the design wavelength. Similarly zone 74 corresponds to 3 zones of a prior art lens. In general, the invention may be characterized as a lens having diffractive power where diffractive zones are terminated by optical steps where one group of zones has optical steps having optical steps with optical heights equal to $j\lambda$ and a second group of zones has optical steps having optical heights equal to $k\lambda$ where $\lambda$ is the design wavelength of the lens and j and k are unequal nonzero integers. As described with respect to the lens of FIG. 1, this requirement may be more precisely stated by saying that the first group of steps have optical heights such that they introduce relative phase shifts of $2j\pi$ at the back conjugate point between light rays of the design wavelength emanating from a point source on the optical axis at a distance equal to the front focal distance from the lens and striking the lens immediately on opposite sides of a step while the second group has heights that introduce relative phase shifts of $2k\pi$ at the back conjugate point between light rays of the design wavelength emanating from a point source on the optical axis at a distance equal to the front focal distance from the lens and striking the lens immediately on opposite sides of a step, where j and k are unequal nonzero integers.

FIG. 2 shows a lens utilizing 5 zones similar to the zones of the prior art, 3 zones corresponding to 2 zones of a prior art lens and 2 zones corresponding to 3 zones of a prior art lens. Those skilled in the art will realize that these numbers are arbitrary. In practice, the number of zones in each group will be determined by the size of those zones and the manufacturing equipment available. When the zones of any given group become too small to accurately produce, a new group is started where the zones of the new group correspond to a large number of zones of a prior art lens. Furthermore, there is no requirement that super zones cannot be associated with more than three prior art zones. The maximum number must be determined on a design-by-design basis. Normally each group of zones will include a plurality of zones, although it is entirely possible that one or more of the groups would include only a single zone. Furthermore it is possible to skip one group, going, for example, from a group of superzones where each zone corresponds to eight prior art zones to one in which each superzone corresponds to ten prior art zones.

FIG. 3 shows a lens corresponding to the lens of FIG. 2, except that the diffractive zones utilize a linear approximation to the curves of the zones of FIG. 2.

A possible alternative approach to the invention would be to make all of the zones in the lens superzones of the size of the largest superzone required. A disadvantage to such an approach is that deviations from the desired hyperbolic contour in the zones closest to the optical axis degrades lens performance by a greater degree than such deviations in zones more remote from the optical axis. This problem is magnified in a lens using the linear contour of FIG. 3 because the linear approximation deviates from the hyperbolic contour more in a superzone than in a single prior art zone. Thus, the invention allows the use of superzones in the regions where the performance degradation is minimal and standard zones, or superzones corresponding to fewer standard zones, in the regions where performance degradation would otherwise occur.

FIG. 4 is a front view of a circular lens according to the invention.

Figure 5:
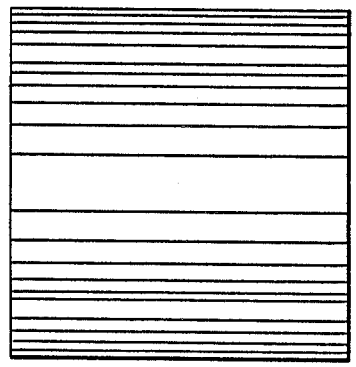
FIG. 5 is a schematic front view of a lens according to a different embodiment of the invention.

FIG. 5 is a front view of a diffractive lens having linear rather than circular zones.

I claim:

1. A lens having diffractive power, said diffractive power being produced by a plurality of diffractive zones, said diffractive zones being terminated by optical steps, a first group of said diffractive zones having optical heights equal to $j\lambda$ and a second group of said diffractive zones having optical heights equal to $k\lambda$ where $\lambda$ is a design wavelength of light of the lens and j and k are unequal nonzero integers.

2. The lens according to claim 1 wherein said lens has an optic axis passing through a first diffractive zone and said first group of diffractive zones is adjacent said first zone and said second group of diffractive zones are separated from said first zone by said first group of zones, said zones of said first group having optical steps having optical heights equal to $\lambda$ and said zones of said second group having optical heights equal to $2\lambda$.

3. The lens according to claim 2 wherein said zones are circular and concentric.

4. The lens according to claim 2 wherein said zones are rectangular.

5. The lens according to claim 2 further comprising a third group of diffractive zones separated from said first zone by said first and second groups of zones, said zones of said third group having optical steps having optical heights equal to $3\lambda$.

6. The lens according to claim 5 wherein said zones are circular and concentric.

7. The lens according to claim 5 wherein said zones are rectangular.

8. The lens according to claim 1 wherein said zones have hyperbolic contours.

9. The lens according to claim 8 wherein said lens has an optic axis passing through a first diffractive zone and said first group of diffractive zones is adjacent said first zone and said second group of diffractive zones are separated from said first zone by said first group of zones, said zones of said first group having optical steps having optical heights equal to $\lambda$ and said zones of said second group having optical heights equal to $2\lambda$.

10. The lens according to claim 9 further comprising a third group of diffractive zones separated from said first zone by said first and second groups of zones, said zones of said third group having optical steps having optical heights equal to $3\lambda$.

11. The lens according to claim 1 wherein said zones have circular contours.

12. The lens according to claim 11 wherein said lens has an optic axis passing through a first diffractive zone and said first group of diffractive zones is adjacent said first zone and said second group of diffractive zones are separated from said first zone by said first group of zones, said zones of said first group having optical steps having optical heights equal to $\lambda$ and said zones of said second group having optical heights equal to $2\lambda$.

13. The lens according to claim 12 further comprising a third group of diffractive zones separated from said first zone by said first and second groups of zones, said zones of said third group having optical steps having optical heights equal to 3λ.

14. The lens according to claim 1 wherein said zones have linear contours.

15. The lens according to claim 14 wherein said lens has an optic axis passing through a first diffractive zone and said first group of diffractive zones is adjacent said first zone and said second group of diffractive zones are separated from said first zone by said first group of zones, said zones of said first group having optical steps having optical heights equal to λ and said zones of said second group having optical heights equal to 2λ.

16. The lens according to claim 15 further comprising a third group of diffractive zones separated from said first zone by said first and second groups of zones, said zones of said third group having optical steps having optical heights equal to 3λ.

17. A lens having diffractive power, front and back focal distances, and an optical axis, said diffractive power being produced by a plurality of diffractive zones, a first group of said diffractive zones having optical steps with optical heights selected such that a relative phase shift of $2j\pi$ at a point on said optical axis a distance from the lens equal to said back focal distance will be introduced between two light rays of a design wavelength emanating from a point source on said optical axis at a distance from said lens equal to said front focal distance and striking said lens immediately on opposite sides of one of said optical steps and a second group of said diffractive zones having optical steps with optical heights selected such that a relative phase shift of $2k\pi$ at a point on said optical axis a distance from said lens equal to said back focal distance will be introduced between two rays of light of said design wavelength emanating from a point source on said optical axis at a distance from said lens equal to said front focal distance and striking said lens immediately on opposite sides of one of said optical steps, where j and k are unequal nonzero integers.

18. The lens according to claim 17 wherein said lens has a first zone, said optical axis passing through said first zone, said first group of zones being adjacent said first zone and said second group of zones being separated from said first zone by said first group of zones, and j is equal to one and k is equal to two.

19. The lens according to claim 18 wherein said zones are circular and concentric.

20. The lens according to claim 18 wherein said zones are rectangular.

21. The lens according to claim 17 further comprising a third group of diffractive zones, said third group being separated from said first zone by said first and second groups of zones, said zones of said third group having optical steps with optical heights such that a relative phase shift of $6\pi$ will be introduced between two rays of light of said design wavelength emanating from a point source on said optical axis and striking said lens immediately on opposite sides of one of said optical steps.

22. The lens according to claim 17 wherein said lens has a major surface and said zones are formed as structures on said major surface.

23. The lens according to claim 22 wherein said lens has a first zone, said optical axis passing through said first zone, said first group of zones being adjacent said first zone and said second group of zones being separated from said first zone by said first group of zones, and j is equal to one and k is equal to two.

24. The lens according to claim 23 further comprising a third group of diffractive zones, said third group being separated from said first zone by said first and second groups of zones, said zones of said third group having optical steps with optical heights such that a relative phase shift of $6\pi$ will be introduced between two rays of light of said design wavelength emanating from a point source on said optical axis and striking said lens immediately on opposite sides of one of said optical steps.

25. The lens according to claim 17 wherein said zones have hyperbolic contours.

26. The lens according to claim 17 wherein said zones have circular contours.

27. The lens according to claim 17 wherein said zones have linear contours.

28. A lens having diffractive power, front and back focal distances, and an optical axis, said diffractive power being produced by a plurality of diffractive zones, a first of said diffractive zones having an optical step with an optical height selected such that a relative phase shift of $2j\pi$ at a point on said optical axis a distance from the lens equal to said back focal distance will be introduced between two light rays of a design wavelength emanating from a point source on said optical axis at a distance from said lens equal to said front focal distance and striking said lens immediately on opposite sides of said optical step of said first zone and a second of said diffractive zones having an optical step with an optical height selected such that a relative phase shift of $2k\pi$ at a point on said optical axis a distance from said lens equal to said back focal distance will be introduced between two rays of light of said design wavelength emanating from a point source on said optical axis at a distance from said lens equal to said front focal distance and striking said lens immediately on opposite sides of said optical step of said second zone, where j and k are unequal nonzero integers.

* * * * *